United States Patent [19]
> Freeman

[11] Patent Number: 4,911,876
[45] Date of Patent: Mar. 27, 1990

[54] METHOD OF FORMING AN INTEGRAL FIBER REINFORCED STRUCTURE

[75] Inventor: Richard B. Freeman, Wilmington, Del.

[73] Assignee: The Budd Company, Troy, Mich.

[21] Appl. No.: 391,100

[22] Filed: Sep. 8, 1989

Related U.S. Application Data

[63] Continuation of Ser. No. 61,508, Jun. 15, 1987, abandoned.

[51] Int. Cl.⁴ .................. B29C 43/10; B29C 45/16; B29C 67/14
[52] U.S. Cl. ..................................... 264/258; 264/314
[58] Field of Search ............... 264/313, 314, 317, 257, 264/258, 101, 102, 328.7, 40.3, 40.5, 112, 116, 129 R, 128, 389, 390, 417, 65, 82; 156/285, 286, 381, 382

[56] References Cited

U.S. PATENT DOCUMENTS

| | | | |
|---|---|---|---|
| 2,460,820 | 2/1949 | Hagopian | 264/314 |
| 3,135,640 | 6/1964 | Kepka | 264/314 |
| 3,137,898 | 6/1964 | Geringer | 264/314 |
| 3,177,105 | 4/1965 | Wiltshire | 264/314 |
| 3,614,811 | 10/1971 | Johnson | 425/389 |
| 4,107,833 | 8/1978 | Knight et al. | 264/46.5 |
| 4,130,614 | 12/1978 | Saidla | 264/46.4 |
| 4,314,964 | 2/1982 | Ferrary | 264/513 |
| 4,323,218 | 4/1982 | Plum | 264/314 |
| 4,357,013 | 11/1982 | Fernandez et al. | 264/54 |
| 4,459,247 | 7/1984 | Rothemund | 264/54 |
| 4,470,865 | 9/1984 | Egan et al. | 264/315 |
| 4,473,208 | 9/1984 | Nava | 264/314 |
| 4,473,520 | 9/1984 | Overcashier et al. | 264/314 |
| 4,477,399 | 10/1984 | Tilton | 264/45.2 |
| 4,559,274 | 12/1985 | Kloppe et al. | 264/45.3 |
| 4,560,523 | 12/1985 | Plumley et al. | 264/314 |
| 4,572,856 | 2/1986 | Gembinski | 264/46.5 |
| 4,721,593 | 1/1988 | Kowal | 264/258 |

Primary Examiner—Jay H. Woo
Assistant Examiner—Jeremiah F. Durkin, II
Attorney, Agent, or Firm—Harness, Dickey & Pierce

[57] ABSTRACT

A method of molding in a single operation an integral fiber structure including a hollow resin impregnated fiber section. A fibrous material is placed in a mold having a hollow section formed by a first mold part and a second mold part formed by second complementary surface portions extending from the hollow first mold part. An inflatable member is placed in the mold in the cavity and inflated. Resin is injected into the fibrous material between the second complementary mold surface portions and flows toward the cavity to impregnate all of the fibrous material. The resin is cured to form a fiber reinforced structure with a sheet-like portion joined to the hollow section.

5 Claims, 1 Drawing Sheet

METHOD OF FORMING AN INTEGRAL FIBER REINFORCED STRUCTURE

CROSS REFERENCE TO RELATED APPLICATION

This application is a continuation application of U.S. Ser. No. 07/061,508, filed June 15, 1987 entitled "Method of Forming an Integral Fiber Structure Including Single and Multiple Fiber Layers" now abandoned by Freeman which is assigned to the assignee of the present invention.

BACKGROUND OF THE INVENTION

Commonly assigned patent applications, Ser. No. 768,259, filed Aug. 22, 1985; Ser. No. 833,304, filed Feb. 26, 1986 (now U.S. Pat. No. 4,740,346 issued Apr. 26, 1988); and Ser. No. 06/854,235 (now U.S. Pat. No. 4,724,115 issued Feb. 9, 1988) describe methods of forming hollow fiber reinforced structures. Resin transfer molding (RTM) is used in the aforementioned applications in which resin impregnates fiber material disposed between mold pieces, with an inflatable bladder occupying a hollow area of the structures being formed. The present application utilizes some of the method steps described in the above mentioned applications which are hereby incorporated by reference.

In many automotive and other products, it is necessary to form parts in which a laminate consisting of one or more large areas of thin, solid, sheet-like regions are joined to hollow sections to form integral structures. Some automotive parts for example, may include rear panels, dashes, fire walls or the like.

OBJECTS OF THE INVETION

It is an object of this invention to provide improved methods and means for fabricating in a single molding operation a structure comprising a thin, solid, large area laminate containing a local hollow section.

It is a further object of this invention to provide an improved method of resin transfer molding an integral fiber reinforced plastic structure having a laminate consisting of one or more layers joined to a hollow piece of fiber material.

BRIEF SUMMARY OF THE INVENTION

In accordance with the present invention, a method of forming an integral fiber reinforced plastic structure in a single molding operation is provided in which a laminate or sheet-like region is joined to a hollow section. A mold including upper and lower pieces each has complementary surfaces, which are totally filled with fiber reinforcement material and rsin, leading to cavity forming surfaces. Fibrous material is also placed along the cavity forming surfaces of the mold. An inflatable member is placed in said cavity between the inserted fibrous material. After the mold is closed, the inflatable member is inflated, with resin then being injected into all of the fibrous material in the mold. After curing, an integral solid fiber structure is formed with the thin, laminate sheet-like layer being integrally joined to a hollow section.

BRIEF DESCRIPTION OF THE DRAWING

Other objects and advantages of the present invention will be apparent and suggest themselves to those skilled in the art, from a reading of the following specification and claims taken in junction with the accompanying drawing in which:

DESCRIPTION OF THE INVENTION

Figure 1:
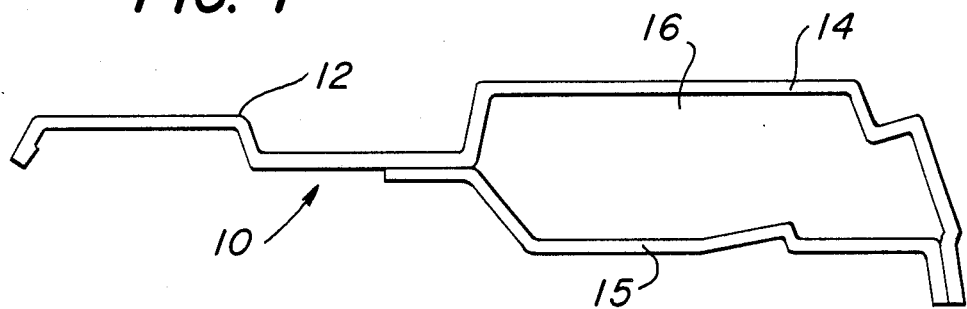
FIG. 1 is a cross-sectional view of a rear panel for an automobile, in accordance with the present invention.

Referring to FIG. 1, a cross-sectional view of a rear panel 10 for use in an automobile, for example, comprises an enlarged, thin sheet-like region 12 made up of a solid laminate section and a hollow section 16 made up of an upper surface 14 and a lower surface 15. In the present invention, the parts illustrated in FIG. 1 are made of a reinforced fiber mat material.

The hollow section 16 is used in areas where stronger or stiffer sections are required. These sections could be in areas of the rear panel, dash members or where a hollow conduit is beneficial in an automobile.

Figure 2:
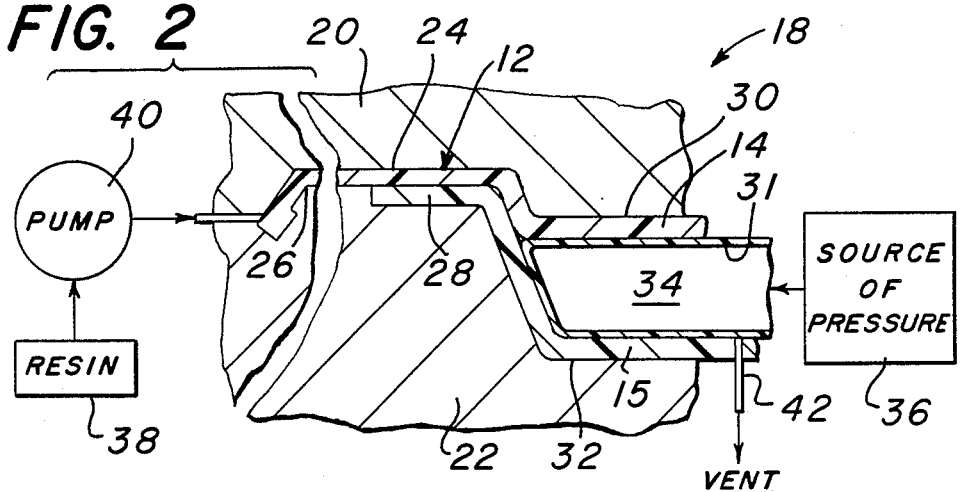
FIG. 2-4 illustrate cross-sectional broken away views of portions of different embodiments of the present invention.
Figure 3:
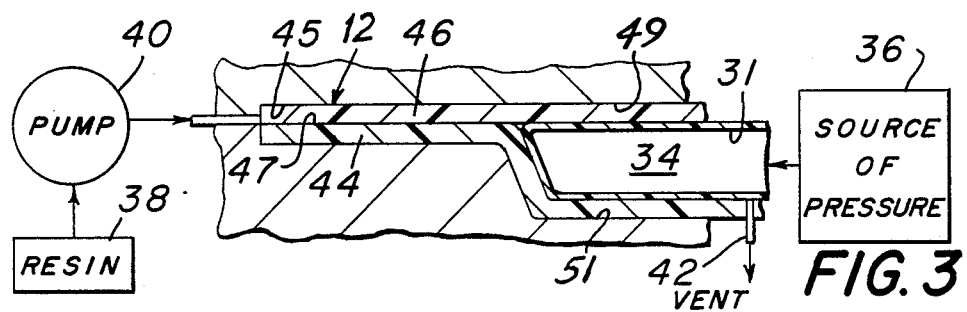
Figure 4:
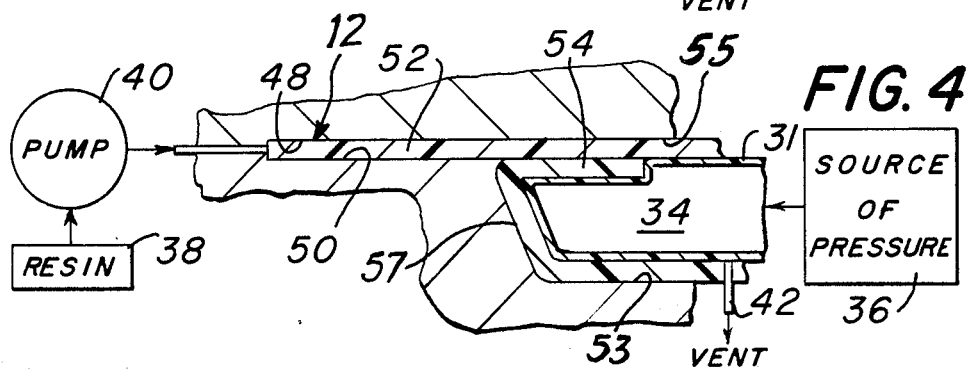

A method of forming a structure such as the structure 10 is illustrated in FIGS. 2, 3 and 4 in which slightly different embodiments are involved. Most of the elements illustrated in FIGS. 2, 3 and 4 are substantially the same as that illustrated in FIG. 1 and therefore the same reference numbers will be assigned. The only difference in the FIGS. 2, 3 and 4 with respect to FIG. 1 are in the specific structures formed and in the ways in which the hollow areas are joined to the sheet-like laminate section of the structure.

Referring to FIG. 2, a mold 18 includes an upper mold piece 20 and a lower mold piece 22. The mold 18 is adapted to be opened and closed by conventional means with the position illustrated in FIG. 2 illustrating the mold 18 in a closed position.

The mold pieces 20 and 22 include complementary surface portions 24 and 26 which essentially define the sheet-like laminate section 12. Mold surface portion 24 blends into a cavity forming mold surface portion 30. Similarly, mold surface portion 26 blends into an opposite cavity forming surface portion 32. Surfaces 30 and 32 cooperate to define hollow section 16. The space between complementary mold surface portions 24 and 26 is considerably less than that between the cavity forming mold surfaces 30 and 32. When the mold 18 is closed, the fibrous material fills the small space between mold surfaces 24 and 26 while a sizeable gap is left between cavity forming surfaces 30 and 32.

In practicing the present invention, the fibrous material is preplaced along the surface portions 24 and 30 of the upper mold piece 20. Analogously, fibrous material is preplaced along surface portions 26 and 32 of the lower mold piece 22 in the manner illustrated in FIG. 2.

When the mold 18 is closed, a cavity 34 is formed between mold surfaces 30 and 32 of the mold pieces 20 and 22. Prior to closing the mold 18, however, an inflatable member or bladder 31 is preplaced between the fibrous material inside the cavity 34 of the mold. After the mold pieces 20 and 22 are closed to the position illustrated in FIG. 2, pressure is applied into the inflatable bladder 31 from a pressure source 36, which may be compressed air or other suitable gaseous material.

After the mold 18 has been closed and pressure applied to the inflatable bladder 31, resin from a source 38 is injected through a pump 40 into the fiber reinforced material between the complementary surface portions 24 and 26 defining the sheet-like laminate region 12. In the drawings the resin is shown as being injected at the side of the mold 18 where ends of the complementary mold surface portions 24 and 26 meet. As the resin is injected into the fibrous material near the side of the mold, the resin flows towards the material surrounding cavity 34 and then out of vent 42, thereby impregnating all of the fibrous material in mold 18. Excess air is also vented through vent 42. Perimeter feeding of the resin and venting of the air may be employed as described in the incorporated by reference Ser. No. 06/833,304, filed Feb. 26, 1986 (now U.S. Pat. No. 4,740,346). The details relating to grooves (not shown) for feeding the resin and venting the air are not illustrated because they are only indirectly related to the present invention.

FIGS. 3 and 4 illustrate different embodiments of the present invention in which different ways for joining the sheet-like laminate or single layer region 12 to the hollow section 34 are illustrated. The mold shapes are slightly different to accommodate the different manners of laying up the fibrous mat material along the mold surfaces. The resin transfer molding steps are the same as described in connection with FIG. 2.

In FIG. 3, the complementary mold surface portions 45 and 47 are flat to receive two flat sections of fibrous material pieces 44 and 46 therebetween. The pieces 44 and 46 continue on to the cavity forming surfaces 49, 51 of the mold. The inflatable bag 31 is placed in the cavity 34 and the subsequent steps are followed as previously described.

In FIG. 4, the complementary mold portions 48 and 50 are again relatively flat to receive a fibrous material piece 52 therebetween. Another fibrous piece 57 lines cavity forming mold surface portion 53 and cooperates with the extension of piece 52 on mold surface portion 55 to define the hollow section 16 of the part. An end section of piece 54 is folded over the direction leading to the cavity 34. The various subsequent steps in the molding process are the same as those described in connection with FIG. 2.

The present invention has provided methods and means for fabricating in a single molding operation a structure comprising a solid sheet-like laminate region containing a local hollow section.

What is claimed is:

1. A method of molding in a single operation an integral fiber structure including a sheet-like resin impregnated fiber reinforced region that extends from a hollow resin impregnated fiber reinforced section, said method comprising:
   (a) providing a mold having a pair of mold pieces disposed to be opened or closed, the mold pieces having first cavity forming surface portions spaced apart from each other by a given distance forming a cavity for defining said hollow section, the mold pieces further including second complementary surface portions having a large area that extend from the first cavity forming surface portions, said complementary surface portions defining said sheet-like region and being spaced apart a distance considerably less than said given distance of the cavity forming surfaces;
   (b) placing fibrous material on the first cavity forming surface portions and second complementary surface portions of said mold pieces when said mold is open;
   (c) placing an inflatable member in said cavity;
   (d) closing said mold so that said fibrous material completely fills the space between said second complementary surface portions that define the sheet-like region;
   (e) inflating said inflatable member;
   (f) injecting resin into the fibrous material between the second complementary mold surface portions and causing it to flow towards said cavity to impregnate all of the fibrous material in the mold; and
   (g) curing said resin to form said fiber reinforced structure with said sheet-like region integrally joined to the hollow section.

2. The method of claim 1 wherein the mold surface portions define a structural part for use in an automobile.

3. The method of claim 2 wherein the mold surface portions define an automotive rear panel.

4. The method of claim 1 wherein a single piece of fibrous material covers both a complementary mold surface portion of one mold piece and its adjacent cavity forming mold surface portion.

5. The method of claim 1 wherein step (f) comprises injecting the resin into a side of the mold where ends of the complementary mold surface portions meet.

* * * * *